United States Patent [19]

Shiota et al.

[11] Patent Number: 5,427,410

[45] Date of Patent: Jun. 27, 1995

[54] AIR BAG WITH LARGE SIZE AND SMALL VOLUME

[75] Inventors: Akihiro Shiota; Yoshihiko Minami, both of Shiga, Japan

[73] Assignee: Takata Corporation, Tokyo, Japan

[21] Appl. No.: 252,116

[22] Filed: May 31, 1994

[30] Foreign Application Priority Data

Jun. 7, 1993 [JP] Japan .................. 5-135673

[51] Int. Cl.⁶ ............................................. B60R 21/20
[52] U.S. Cl. ................ 280/743.01; 280/738; 280/729
[58] Field of Search ............. 280/743 R, 738, 739, 280/228 R, 729, 731

[56] References Cited

U.S. PATENT DOCUMENTS

| | | | |
|---|---|---|---|
| 3,784,225 | 1/1974 | Fleck et al. | 280/729 |
| 4,500,114 | 2/1985 | Grey, Jr. | 280/738 X |
| 4,934,734 | 6/1990 | Takada | 280/731 |
| 5,094,476 | 3/1992 | Chihaya | 280/745 R |

*Primary Examiner*—Margaret A. Focarino
*Assistant Examiner*—Christopher Ellis
*Attorney, Agent, or Firm*—Kanesaka & Takeuchi

[57] ABSTRACT

An air bag has openings disposed on both of side surfaces of the air bag and a cylindrical cloth attached inside of the air bag to communicate the openings with each other. Both sides of the cylindrical cloth are connected to the side surfaces of the air bag. A vent hole is disposed in the cylindrical cloth.

4 Claims, 5 Drawing Sheets

AIR BAG WITH LARGE SIZE AND SMALL VOLUME

BACKGROUND OF THE INVENTION

1. Field of the Invention

The present invention relates to an air bag device for protecting a vehicle occupant by extending an air bag in the event of a collision, particularly, to an air bag device wherein a volume of an airbag is reduced to shorten an extension time of the air bag. More particularly, the present invention relates to an air bag suitable for use in an air bag device for a passenger seat or a rear seat.

2. Description of Prior Art

An air bag device for a passenger seat or a rear seat protects an occupant by extending an air bag in a collision. The device comprises the air bag in a folded state, a retainer or a container for accommodating the air bag, a lid covering the air bag, an inflator (gas generator) for extending the air bag and the like. The air bag device is installed in an instrument panel or a back portion of a backrest of a front seat in a vehicle.

A conventional air bag device for a passenger will now be described with its operation referring to FIG. 7. An air bag 10' is properly folded and accommodated in a container 12' before the air bag device works. A front opening of the container 12' is covered by a lid 14'. When a vehicle collides, an inflator 16' starts to extend the air bag 10'. The lid 14' is pushed by the air bag 10' and opened like a door as shown in the figure so that the air bag 10' is extended in the cabin of the vehicle. The numeral 18' designates an opening for introducing gas from the inflator 16' into the container 12'.

In the conventional air bag device for the passenger, the volume of the air bag is large as compared with the air bag device for a driver. Therefore, the output capacity of the inflator has been increased or the volume of the air bag has been decreased to shorten the extension time so as to quickly restrain the occupant. However, due to the accomplishment of the function of the air bag, there is a limit for decreasing the volume of the air bag.

SUMMARY OF THE INVENTION

It is therefore an object of the present invention to provide an air bag for restraining an occupant in a very short time after an air bag device starts to work.

It is another object of the present invention to provide an air bag for quickly restraining an occupant even if an output capacity of an inflator is not increased.

It is still another object of the present invention to provide an air bag for quickly restraining an occupant even if its volume is large.

In an air bag of the present invention having an opening for introducing gas or for inserting an inflator, the air bag is provided with a cavity communicating with the outside of the air bag in a middle portion between a rear portion and a front portion.

In the air bag, the cavity communicating with the outside of the air bag is disposed on the upper part of the air bag in a state that the extension of the air bag is finished completely.

In the air bag, a vent hole is disposed in the air bag facing the cavity.

According to the present invention, the cavity is disposed on the middle portion between the rear portion and front portion, thereby reduction in the volume of the air bag is accomplished still maintaining an occupant protection function.

Further, according to the present invention, the cavity is disposed on the upper part of the air bag so that the lower part of the air bag is extended earlier than the upper part SO as to restrain the occupant's waist.

Furthermore, according to the present invention, gas flown from the vent hole goes out to the outside through the cavity.

DETAILED DESCRIPTION OF THE PREFERRED EMBODIMENT

Figure 1:
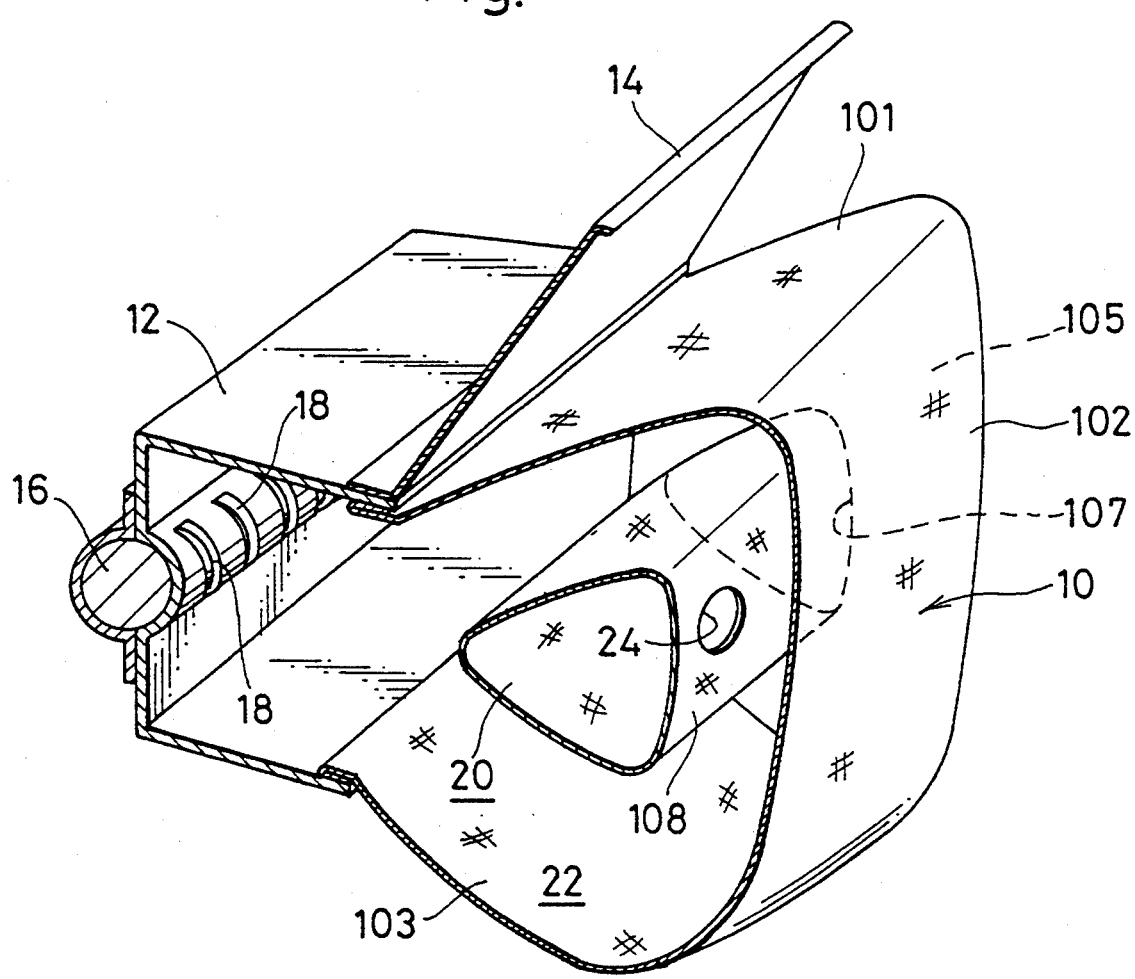
FIG. 1 is a sectional perspective view showing an air bag extended according to an embodiment.

An air bag according to an embodiment of the present invention will now be described with reference to FIG. 1 and FIG. 2.

In the following embodiment, the same parts as the conventional air bag are designated by the same numerals without dash, respectively.

Also in this embodiment, an air bag 10 is fixed to a container 12. An inflator 16 is mounted on the container 12 and discharges gas through a gas outlet 18 of the inflator 16 into the air bag 10. The air bag 10 lifts a lid 14 covering an opening of the container 12 and extends into the cabin of the vehicle.

In this embodiment, the air bag 10 has an extension chamber 22 forming an inner space of the air bag 10. A cavity 20 is disposed about in the center along a direction of back and forth in the extension chamber 22. The cavity 20 penetrates the extension chamber 22 to communicate from one side to the other side of the air bag 10.

The air bag 10 has a roughly ringwise shape as seen from the side thereof. The air bag 10 is formed in such a form by sewing a woven fabric made of synthetic fiber or the like. Instead of the sewing, the other joining means such as heat sealing can be employed.

The air bag 10 has a vent hole 24 facing the cavity 20. The vent hole 24 is for discharging gas out of the air bag 10 to the outside when an occupant plunges into the air bag 10.

Further, the structure of the air bag 10 is now be described in detail.

The air bag 10 has an upper surface panel 101, a front surface panel 102, a lower surface panel 103, a left side panel 104 and a right side panel 105. The panels 101, 102 and 103 are formed of one-piece sheet of a fabric. Each of the side panels 104 and 105 is seamed with the one-piece sheet of the fabric, respectively.

The side panels 104 and 105 have openings 106 and 107, respectively. Both ends of a cylindrical cloth 108 are seamed with edges of the openings 106 and 107. The vent hole 24 is disposed to the cylindrical cloth 108.

Figure 2:
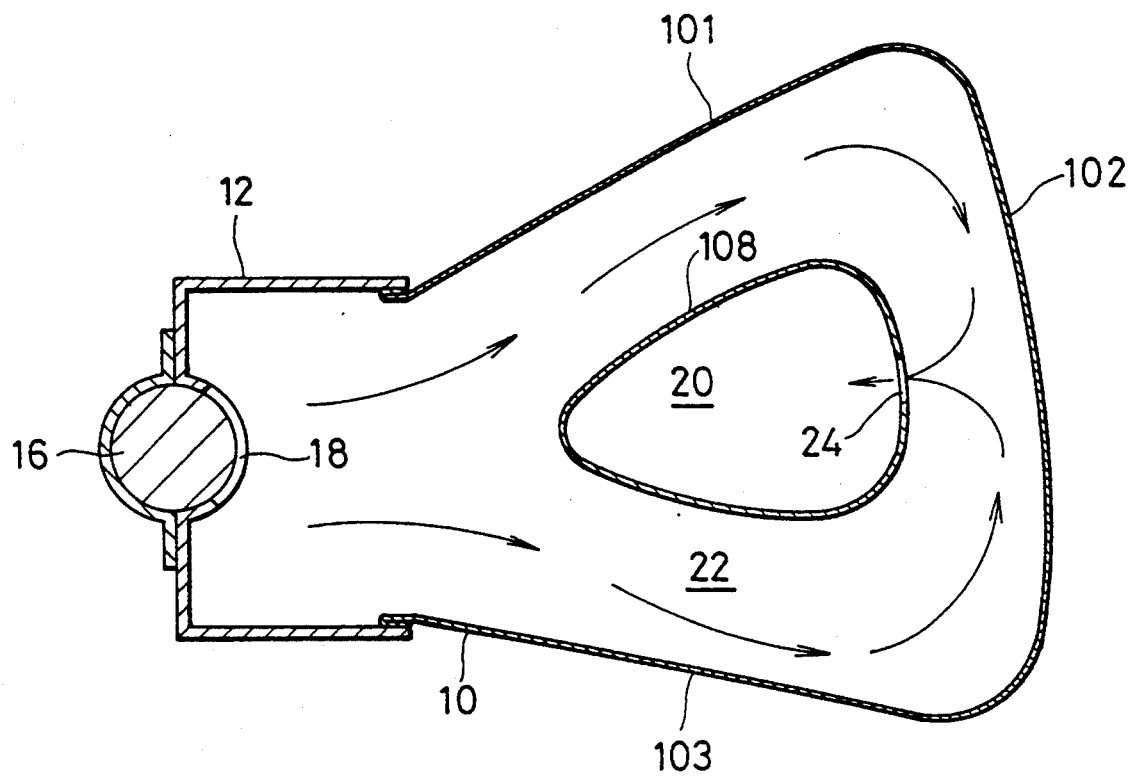
FIG. 2 is a vertical cross-sectional view showing the air bag extended according to the embodiment.

In FIG. 2, the arrow shows gas flow generated and discharged by the inflator 16. The gas spouted to the inside of the air bag 10 from the inflator 16 as shown by the arrow is separated to flow into each of directions of an upper part and a lower part to extend the air bag. When the occupant plunges into the air bag 10 which is extended, the gas is discharged into the cavity 20 through the vent hole 24 so as to absorb energy of impact.

The air bag 10 has the extension chamber 22 the volume of which is smaller for the amounts of the cavity 20. Therefore, the extension of the air bag 10 is completed in a short time after the inflator 16 works.

Figure 3:
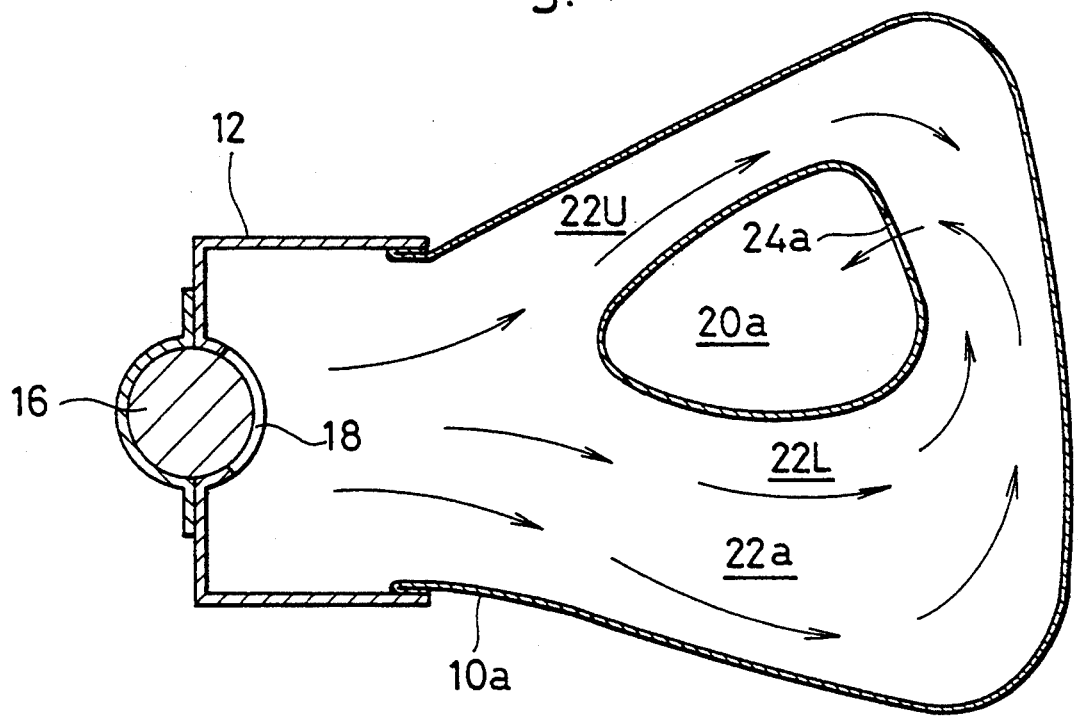
FIG. 3 is a vertical cross-sectional view showing an air bag extended according to another embodiment.

FIG. 3 is a vertical cross-sectional view showing an air bag 10a according to a second embodiment. In FIG. 3, a cavity 20a is positioned at a slightly upper part of a center of an extension chamber 22a and gas paths are disposed above and below the extension chamber 22a. A lower gas path 22L is wider than an upper gas path 22U.

The air bag 10a having the cavity 20a extends fully within a very short time as in the air bag of the above embodiment.

In this embodiment, in particular, since the lower gas path 22L has smaller gas flow resistance than the upper gas path 22U, the gas discharged into the air bag from the inflator 16 tends to flow into the lower path 22L more than the upper path 22U, so that a lower part of the air bag extends earlier than an upper part thereof.

Figure 4:
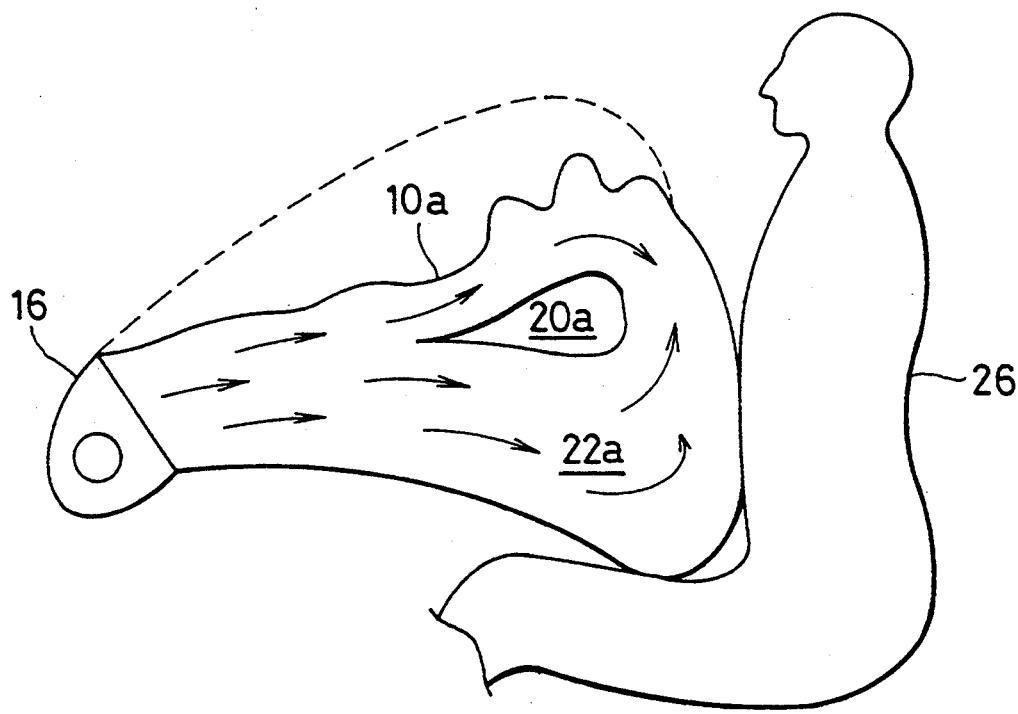
FIG. 4 is a simplified cross-sectional view showing a first stage of a extension of an air bag according to further another embodiment.
Figure 5:
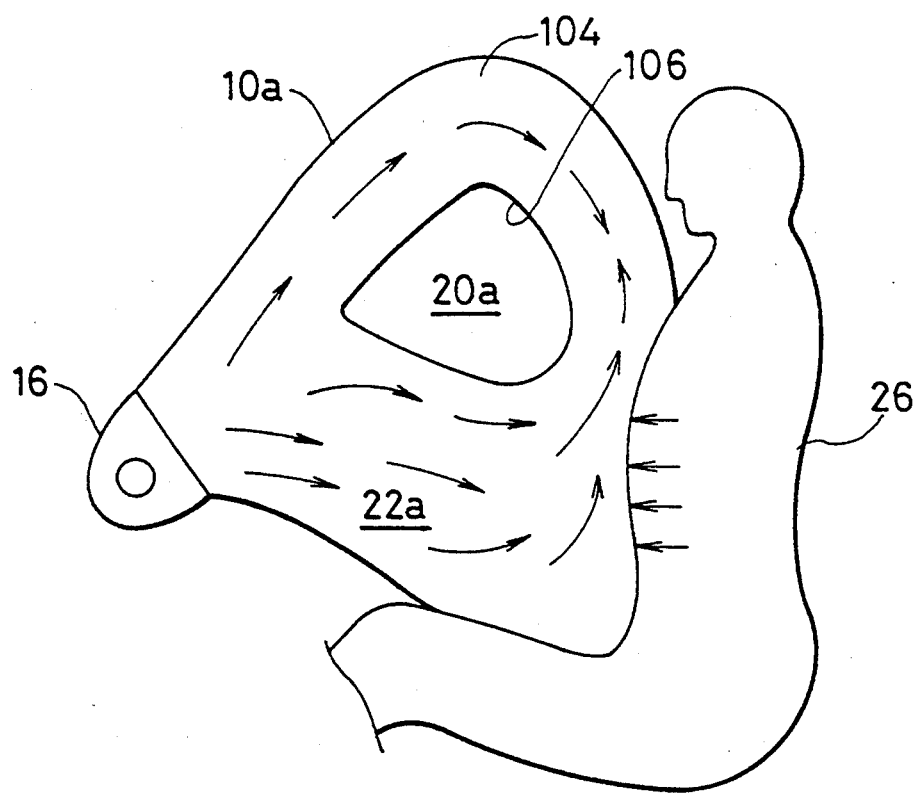
FIG. 5 is a simplified cross-sectional view showing a last stage of the extension of the air bag according to the embodiment.
Figure 6:
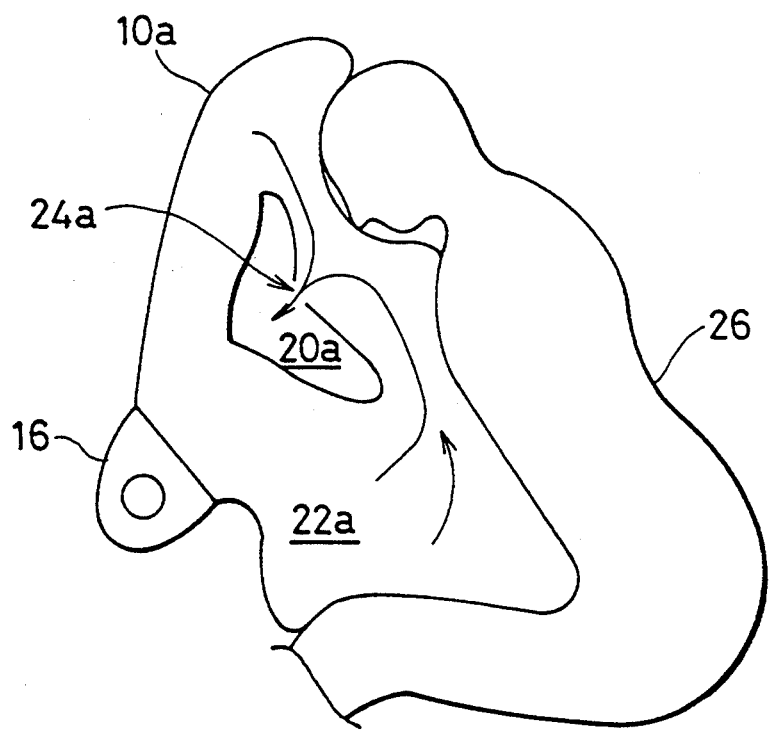
FIG. 6 is a simplified cross-sectional view showing an intermediate stage of protecting an occupant of the air bag according to the embodiment; and, FIG. 7 is a sectional perspective view showing an air bag extended in the prior art.
Figure 7:
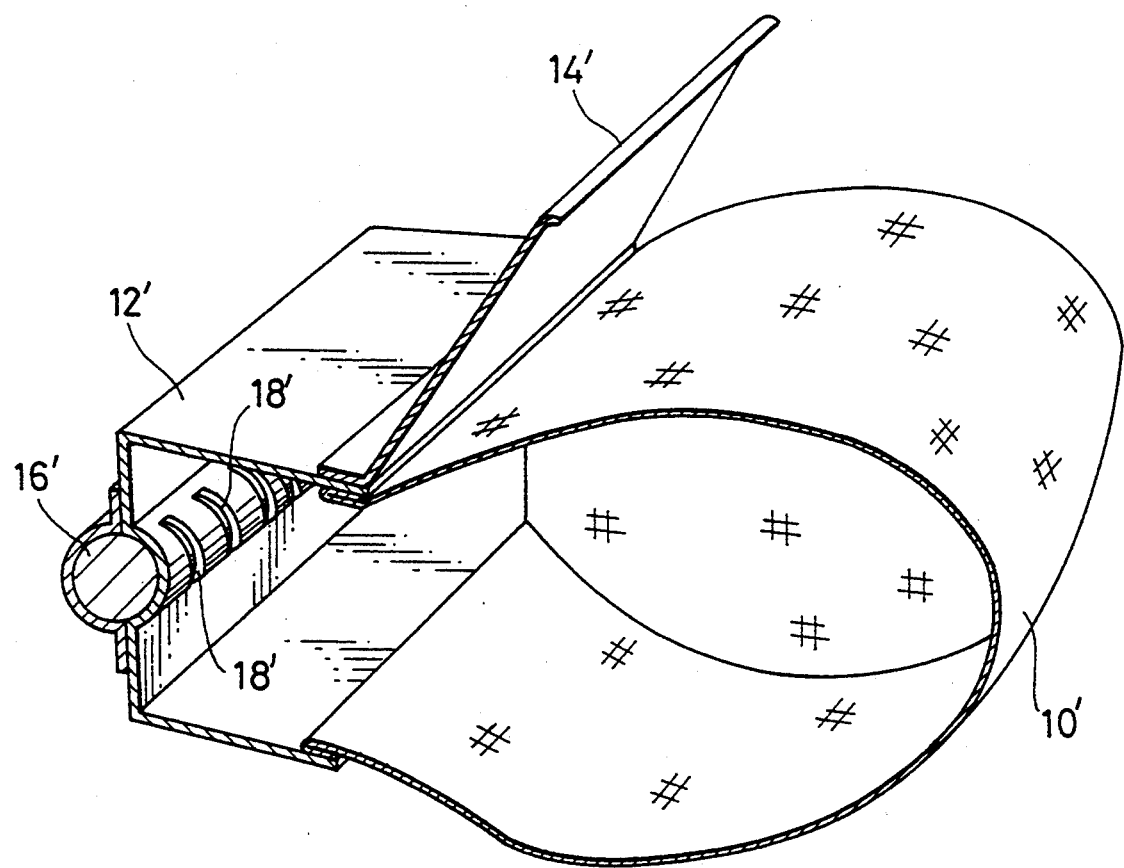

Description will now be made as regard to an operation of the air bag according to the second embodiment for restraining an occupant with reference to FIGS. 4–6. FIGS. 4–6 are simplified cross-sectional views showing a position relationship between the air bag 10a and the occupant 26 during a collision.

The occupant on a seat is generally flung frontwardly with a whole body thereof by inertia at an initial state of a collision, and then an upper half of the occupant's body pivots frontwardly around his or her waist. In this embodiment, the waist of the occupant 26 is restrained by the air bag 10a at first and then the chest and the head of the occupant 26 are received by the air bag 10a as detailed below.

FIG. 4 shows a state where the lower part of the air bag 10a is extended to restrain the waist of the occupant 26. The air bag 10a starts to extend at the lower chamber 22L as described above. In FIG. 4, the lower part of the air bag 10a is extended in substantially full, while the upper part of the air bag 10a is little extended.

FIG. 5 shows a state where the upper part of the air bag 10a is also extended fully by the gas discharged successively and by a pressure of the lower part of the air bag 10a plunged by the occupant 26 thereto.

FIG. 6 shows a state where an impact applied to the occupant 26 plunging by the air bag 10a is absorbed by discharging the gas through the vent hole 24a disposed in the air bag 10a.

As shown from FIGS. 4–6, in this embodiment, the lower part of the air bag 10a extends earlier than the upper part of the air bag 10a to restrain the occupant's waist soon after the collision. Although the upper part of the air bag 10a extends later than the lower part of the air bag 10a, the upper part of the air bag 10a is extended enough large to restrain the occupant's chest and head with very small impact when they are plunged to the air bag 10a.

Therefore, even if the inflator 16 has a small capability, the air bag 10a extends enough early and promptly to restrain the occupant.

In the above described embodiments, the vent holes 24, 24a are disposed to face to the cavities 20, 20a, so that the gases flown out of the vent holes 24, 24a do not make direct contact with the occupant.

It should be understood, however, that the vent hole may be disposed on the other place than shown in the drawings.

According to the air bag of the present invention, the inertial volume of the air bag can be reduced with the cavity provided in the extension chamber of the air bag. Therefore, extending time of the air bag can be shortened even when the capability of the inflator is not increased. In addition, the air bag extends fully even if the capability of the inflator is reduced.

The air bag of the present invention can restrain the occupant even if the volume of the air bag is reduced.

In the air bag of the present invention, the gas flown out of the vent hole does not make direct contact with the occupant.

What is claimed is:

1. An air bag for protecting an occupant, comprising:
   an outer cloth for defining an outer periphery of the air bag, and having a front portion facing the occupant and two side portions, and
   a hollow cloth connected to the side portions of the outer cloth to be located in a center area of the air bag, said hollow cloth forming a cavity inside the air bag communicating with an atmosphere, said hollow cloth having a vent hole at a side facing the front portion of the outer cloth so that when the occupant plunges into the air bag filled with a gas in a space between the outer and hollow cloths, the gas is discharged through the vent hole and into the atmosphere to absorb impact from the occupant.

2. An air bag according to claim 1, wherein each side portion has an opening, said hollow cloth being connected to the side portions around the openings.

3. An air bag according to claim 2, wherein said hollow cloth is located at an upper portion of the air bag so that when the air bag is expanded, a lower portion of the air bag expands first.

4. An air bag according to claim 3, wherein said outer cloth and hollow cloth have elongated cylindrical shapes.

* * * * *